E. T. NEBEN.
MULTICOLOR PRINTING ROLL AND METHOD OF MAKING.
APPLICATION FILED OCT. 12, 1912.
1,159,337.
Patented Nov. 2, 1915.
2 SHEETS—SHEET 2.
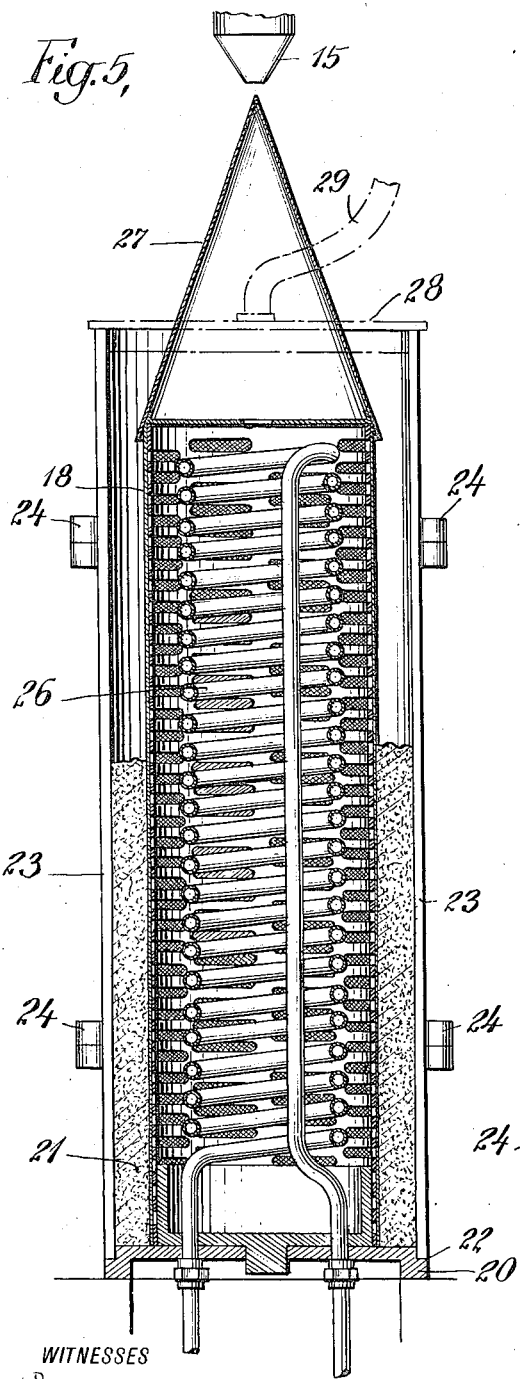
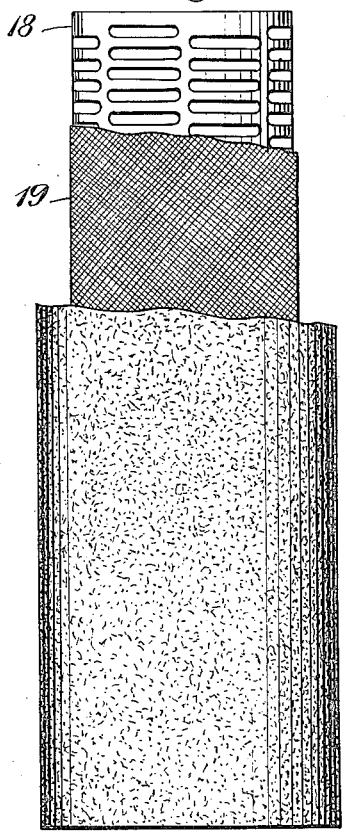
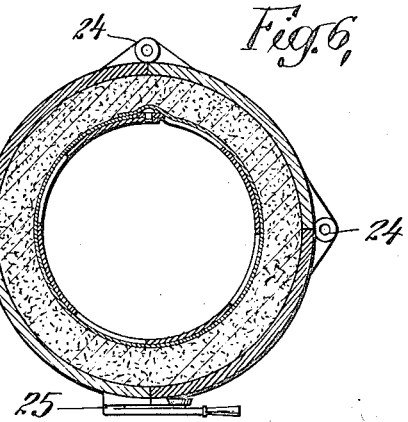
INVENTOR
Emil T. Neben
BY Chas. F. Earll
ATTORNEYS
WITNESSES
Ernest Miller
W. C. Jordan

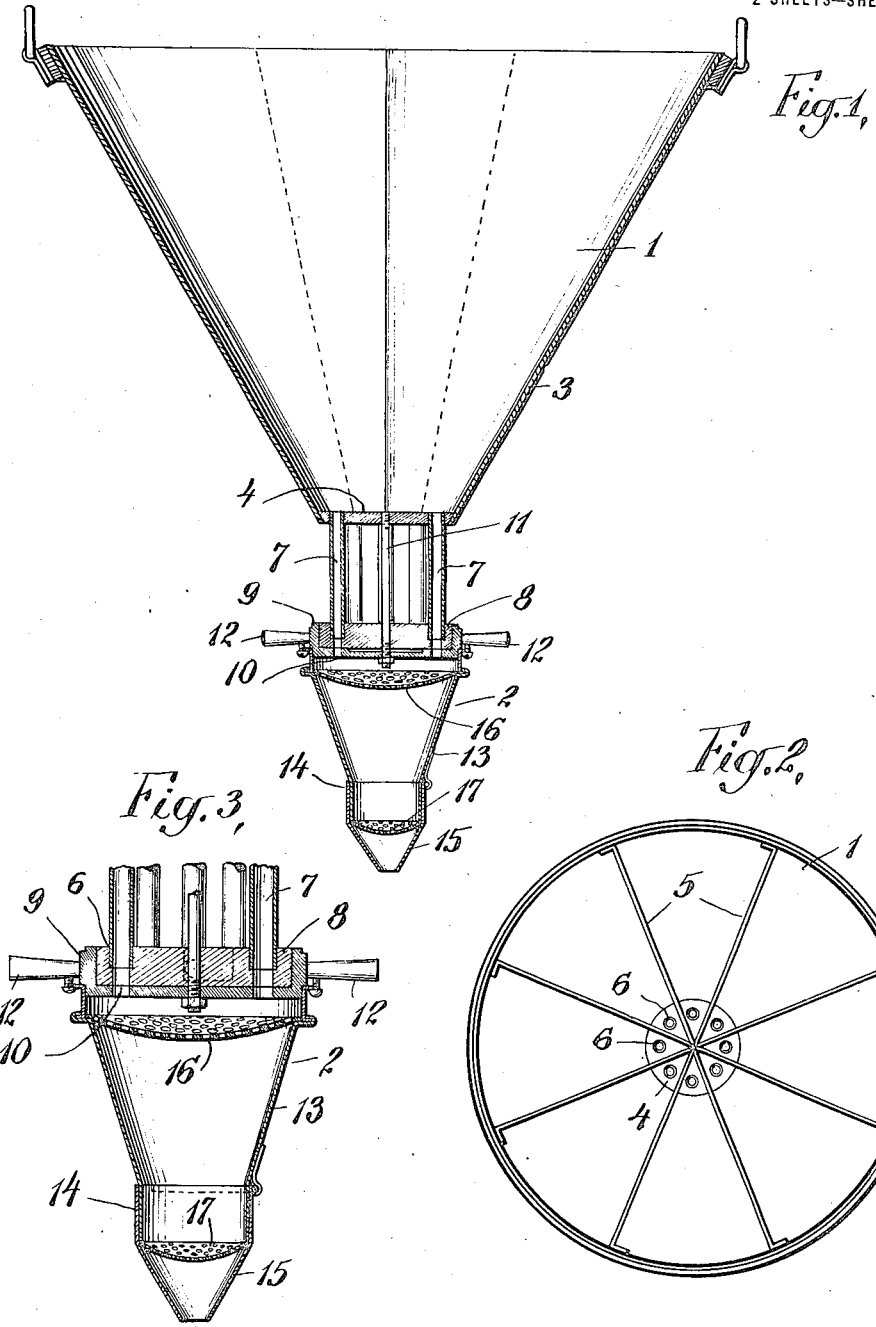

UNITED STATES PATENT OFFICE.

EMIL T. NEBEN, OF BROOKLYN, NEW YORK, ASSIGNOR TO PARAGON FIBRE COLORING CORPORATION, OF NEW YORK, N. Y., A CORPORATION OF NEW YORK.

MULTICOLOR-PRINTING ROLL AND METHOD OF MAKING.

1,159,337.  Specification of Letters Patent.  Patented Nov. 2, 1915.

Application filed October 12, 1912. Serial No. 725,372.

*To all whom it may concern:*

Be it known that I, EMIL T. NEBEN, a citizen of the United States of America, and resident of the city of Brooklyn, county of Kings, and State of New York, have invented certain new and useful Improvements in Multicolor-Printing Rolls and Methods of Making, of which the following is a specification.

My invention relates to multi-color printing rolls, the composition of which the rolls are made, and methods by which the composition and rolls are made.

The object of my invention is to produce a material and a printing roll by means of which surfaces of various descriptions may be printed in vari-colored designs with a great variety of novel and pleasing effects, in a simple and effective manner, and at very small expense.

My invention consists in providing a novel composition which is relatively hard and tough and impregnated or mixed with a uniformly diffused soluble dye or pigment, and which is sufficiently soluble to effectively print on a moistened surface at high speed and yet retain its hardness and toughness, in forming a roll of said composition, generally of two or more portions thereof differently colored, upon a specially constructed core or sleeve.

My invention consists further in the method of making said composition and said roll.

In the drawings accompanying and forming part of this specification, Figure 1 represents a vertical section of a partitioned funnel or reservoir in which the differently colored portions of the composition are mixed prior to their introduction to the mold; Fig. 2 is a plan view of the same; Fig. 3 is an enlarged section on line 3—3 of Fig. 1; Fig. 4 is a side view of the perforated core or sleeve on which the composition is cast; and Fig. 5 is a vertical section of the mold.

The composition of which the roll is formed consists essentially of a mixture of a gelatinous substance such as glue with an inert absorbent non-gritty earthy substance such as infusorial earth, an inert non-gritty earthy substance such as talc, which does not mix so readily with water, a vegetable gum such as dextrin, gum arabic, or starch, a substance having relatively high hygroscopic properties, such as brown sugar or molasses or glycerin, or a combination of such substances, and a vegetable oil such as corn oil, together with water.

In the preferred form of the composition the following substances are used in the following proportions: glue, 14 lbs., infusorial earth, 10 lbs., talc, 6 lbs., dextrin, 8 lbs., brown sugar, 9 lbs., glycerin, 2 oz., corn oil, 2 lbs., and water, 45 lbs. These substances and proportions may, however, be varied more or less, for, as will be readily understood, this mixture does not form a definite chemical compound. A mixture, however, of substantially these materials in substantially the above proportions, forms a mass having certain definite physical characteristics which are essential for the purposes of my invention. These properties are, that the composition is liquid when hot, having about the viscosity of molasses, that it is hard and tough at ordinary temperatures and capable of withstanding a high rotative speed and pressure sufficient to produce a good impression, in the form of a roll without distortion, that when it is hot it will absorb and dissolve soluble pigments such as anilin dyes uniformly throughout its mass, that when different colored masses of the composition are melted and run together they do not diffuse and blend or dissolve one in the other, and finally that when a cold colored portion of the composition contacts a moist surface, as when it is in the form of a printing roll, it dissolves sufficiently at the surface to effectively print, but the moisture at the surface does not penetrate into the body of the mass to any detrimental extent so as to soften or distort the same, and the surface does not become sticky or tacky. The proportions of the various substances entering into the composition may be varied somewhat, as for instance, more brown sugar and less glycerin may be employed, or vice versa, less brown sugar and more glycerin, as both of these substances have relatively high hygroscopic properties. I have found however, that where too much glycerin is employed the rolls are apt to be too soft and where too much of the glycerin is replaced by brown sugar the impression is less distinct. In the same way gum arabic may be substituted for dextrin, or a mixture of gum arabic and dextrin. I prefer to use the dextrin, however, because with it the roll is less likely to crack in the drying and hardening process; and the vegetable oil may be omitted. I prefer, however, to use a certain amount of vegetable oil as its effect is to toughen the roll and render it less brittle. By long experimenting I have discovered that a hard composition is necessary for producing practical multi-color printing rolls of this character, and that inert non-gritty earthy substances such as infusorial earth and talc give the requisite hardness and at the same time prevent the surface from becoming sticky or tacky, while soft rolls such as those made of various gelatinous compositions without such earthy substances have not sufficient hardness to withstand the necessary pressure to produce good impressions, and they become distorted and tacky, and accumulate lint and fibrous matter from the surface printed upon. I have also discovered that the addition of such earthy substances facilitates the absorption of the anilin dyes, and the ready giving up of the same to the surface printed upon.

In the preferred method of preparing the composition I first soak the glue in cold water until it swells, for a period of say twenty-four hours. I then pour off the water which contains a small amount of glue in solution, and thoroughly mix it with infusorial earth. I then add the talc, sugar, oil, glycerin, and more water and thoroughly mix. The soaked glue is then boiled and poured into the other ingredients and the whole is thoroughly mixed. This mixture is kept hot and continually agitated and thoroughly mixed, until the mass is homogeneous. The mass may be then poured into pans and allowed to cool and harden, to be remelted subsequently for the addition of the coloring matter, or the coloring matter may be added while it is still hot and in the liquid form.

In the drawings numeral 1 represents a partitioned funnel or reservoir into the different compartments of which the differently colored portions of the melted composition are severally poured and kept separate until they are allowed to pass out of said compartments through valved openings into the commingling device 2, secured to the bottom of the reservoir 1. The conical shell 3 of the reservoir is secured to the base 4 and radial partition plates 5 which meet at the center of the reservoir are secured to the inner periphery of the shell 3. The base 4 is provided with perforations 6 in which are secured vertical pipes 7 having a plate or disk 8 secured to their lower ends, which plate is also perforated in line with the openings in the pipes 7. A valve plate or disk 9 is pivotally secured to the plate 8 and is provided with perforations 10 which register with the perforations in the plate 8.

The valve plate 9 is held in position by the stud 11, secured at its upper end to the base 4 of the reservoir. The valve plate 9 is provided with handles 12 by means of which it may be turned to open and close the openings in the plate 8. The commingling device 2 is secured directly to the valve plate 9 and it consists of a conical shell 13 having a cylindrical extension 14 at its lower end, to which is detachably secured the spout 15. A perforated disk 16 is mounted in the upper part of the commingling device and another perforated disk 17 is mounted beneath the disk 16, preferably at the upper end of the spout 15. These disks are preferably dished or saucer shaped. As will be readily understood, when two or more of the compartments of the reservoir contain melted differently colored portions of the composition, and the valve plate 9 is turned to cause the holes 10 to register with the openings in the plate 8, the composition will pass through the valve plate onto a perforated disk 16, commingling or mixing more or less. They will then pass down through the perforated disk 17 and still further mix or commingle, the amount and character of the commingling depending upon the number and size of the perforations in the disks 16 and 17, and the combined or commingled mass of the composition will issue from the spout 15 in a variegated or vari-colored stream, the particular character of which will depend upon the number of differently colored masses of composition used, the particular colors employed and the size and number of the perforations of the perforated disks 16 and 17. It will be evident that the number of perforated disks employed in the commingling device may be increased or diminished, according to the character of the mixture or variegated effect desired.

For the formation of a printing roll of the variegated composition as above described, I provide a metallic core 18, which is made of perforated sheet metal. On this core is secured by means of glue or otherwise, a fabric 19, such as cheese-cloth or canvas, the fabric being of such character as to prevent the liquid composition from passing through the interstices, while it permits the passage of moisture therethrough during the drying and hardening process in the formation of the roll.

The fabric-covered perforated core, as above described, is placed in a mold to have the composition cast upon it. The mold is constructed as follows: A base 20 is provided with a central cylindrical projection 21, adapted to receive the end of the core 18, and a cylindrical seat 22 adapted to receive the lower end of the side walls 23. The side walls are preferably made of four longitudinal sections pivotally joined together by the hinges 24 and provided with a locking device 25. A heating coil 26 through which steam or hot water may be caused to circulate enters through the base 20 and extends upwardly to about the top of the perforated core 18. I provide a conical shield 27 to place upon the top of the core 18 during the pouring of the composition into the mold to prevent any of the composition from passing into the center of the core. After a sufficient quantity of the composition has been poured into the mold, the shield 27 is removed and a cap 28 is placed upon the top of the mold. The cap 28 is adapted to make an air-tight joint with the mold and it is provided with a pipe 29 by means of which it may be connected with a vacuum pump so that the air and moisture may be exhausted from the mold after the roll has been poured or cast, to assist in the drying and hardening of the roll.

Having thus described my invention, what I claim is:

1. A printing composition for multicolor printing rolls and blocks embodying a plurality of differently colored masses each consisting of a body mass composed of an aqueous glutinous substance, a finely divided silicious substance, talc, and a hygroscopic substance, and a soluble pigment homogeneously mixed with said body mass.

2. A printing composition for multicolor printing rolls and blocks embodying a plurality of differently colored masses each consisting of a body mass composed of glue and water, infusorial earth, talc, and a hygroscopic substance, and an anilin color homogeneously mixed with said body mass.

3. A printing composition for multicolor printing rolls and blocks embodying a plurality of differently colored masses each consisting of a body mass composed of glue and water, infusorial earth, talc, brown sugar, and a vegetable oil, and a soluble pigment homogeneously mixed with said body mass.

4. A printing composition for multicolor printing rolls and blocks embodying a plurality of differently colored masses each consisting of a body mass composed of glue and water, infusorial earth, talc, dextrin, brown sugar, glycerin, and corn oil, and an anilin color homogeneously mixed with said body mass.

5. A printing composition consisting of substantially fourteen parts of glue, ten parts of infusorial earth, and six parts of talc, mixed with a vegetable gum, a hygroscopic substance, and a soluble pigment.

6. A printing composition composed substantially of fourteen parts of glue, ten parts of infusorial earth, six parts of talc, eight parts of dextrin, a hygroscopic substance and a soluble pigment.

7. A printing composition composed substantially of fourteen parts of glue, ten parts of infusorial earth, six parts of talc, eight parts of dextrin, nine parts of brown sugar, one-eighth part of glycerin, and a soluble pigment.

8. A printing composition composed substantially of fourteen parts of glue, ten parts of infusorial earth, six parts of talc, eight parts of dextrin, nine parts of brown sugar, one-eighth part of glycerin, two parts of vegetable oil, and a soluble pigment.

9. The process of producing a composition for color printing rolls and blocks consisting in mixing with glue water a finely divided silicious substance, talc, dextrin, a hygroscopic substance, boiling glue swelled in water, and incorporating this hot liquid glue, and homogeneously mixing with said body mass a coloring principle.

10. The process of producing a composition for multicolor printing rolls and blocks embodying a plurality of differently colored masses consisting in mixing with glue water infusorial earth, talc, dextrin, brown sugar, a vegetable oil, boiling glue swelled in water, and incorporating this hot liquid glue, and homogeneously mixing with separate portions of said body mass a different coloring principle in each operation.

11. The process of producing a printing composition embodying a plurality of differently colored masses consisting in mixing with glue water infusorial earth, talc, dextrin, brown sugar, a vegetable oil, boiling glue swelled in water, and incorporating this hot liquid glue, homogeneously mixing with separate portions of said body mass a different coloring principle in each operation, and forming printing rolls therefrom.

In testimony whereof, I have signed my name to this specification in the presence of two subscribing witnesses.

EMIL T. NEBEN.

Witnesses:
  FLORENCE J. WALSH,
  FLOYD NEBEN.